United States Patent
Preza et al.

(10) Patent No.: US 11,947,098 B2
(45) Date of Patent: Apr. 2, 2024

(54) MULTI-FOCAL LIGHT-SHEET STRUCTURED ILLUMINATION FLUORESCENCE MICROSCOPY SYSTEM

(71) Applicants: Chrysanthe Preza, Memphis, TN (US); Ana Doblas, Memphis, TN (US); Genaro Saavedra-Tortosa, Valencia (ES); Manuel Martinez-Corral, Valencia (ES); Juan Carlos Barreiro, Valencia (ES)

(72) Inventors: Chrysanthe Preza, Memphis, TN (US); Ana Doblas, Memphis, TN (US); Genaro Saavedra-Tortosa, Valencia (ES); Manuel Martinez-Corral, Valencia (ES); Juan Carlos Barreiro, Valencia (ES)

(*) Notice: Subject to any disclaimer, the term of this patent is extended or adjusted under 35 U.S.C. 154(b) by 0 days.

(21) Appl. No.: 17/707,628

(22) Filed: Mar. 29, 2022

(65) Prior Publication Data
US 2022/0291495 A1    Sep. 15, 2022

Related U.S. Application Data

(63) Continuation of application No. 16/024,807, filed on Jun. 30, 2018, now Pat. No. 11,287,627.

(60) Provisional application No. 62/527,232, filed on Jun. 30, 2017.

(51) Int. Cl.
G02B 21/00    (2006.01)

(52) U.S. Cl.
CPC ..... *G02B 21/0076* (2013.01); *G02B 21/0032* (2013.01); *G02B 21/0064* (2013.01)

(58) Field of Classification Search
CPC ........... G02B 21/0076; G02B 21/0032; G02B 21/0064; G02B 21/367; G02B 27/58
USPC ........................................................ 359/385
See application file for complete search history.

(56) References Cited

U.S. PATENT DOCUMENTS

| | | | | |
|---|---|---|---|---|
| 3,495,890 | A * | 2/1970 | Pluta | G02B 21/14 359/371 |
| 4,972,451 | A * | 11/1990 | Brok | H04N 17/002 378/207 |
| 5,037,202 | A * | 8/1991 | Batchelder | G01N 15/0205 356/336 |
| 6,025,956 | A * | 2/2000 | Nagano | G02B 21/16 359/368 |
| 6,166,853 | A * | 12/2000 | Sapia | G06T 5/20 382/254 |
| 6,657,216 | B1 * | 12/2003 | Poris | G01B 11/0608 250/559.22 |
| 9,046,422 | B2 * | 6/2015 | Kudenov | G01J 3/0229 |
| 9,599,805 | B2 * | 3/2017 | Chiang | G02B 21/082 |

(Continued)

*Primary Examiner* — Balram T Parbadia
*Assistant Examiner* — Rahman Abdur
(74) *Attorney, Agent, or Firm* — Wayne Edward Ramage; Baker Donelson

(57) ABSTRACT

A multi-focal light-sheet structured illumination system that can be implemented as a part of a commercial fluorescence microscope or a module that is adaptable to fit a number of commercially available microscopes. The system provides simultaneous capture of 2D images from multiple planes within a 3D volume, which are resolved laterally and axially to provide improved resolution along the three dimensions (x,y,z). A Wollaston prism allows several axially-localized high-contrast structured illumination patterns to be generated.

20 Claims, 4 Drawing Sheets

(56) References Cited

U.S. PATENT DOCUMENTS

2007/0236788 A1* 10/2007 Kruger ............... G02B 21/0092
                                                        359/386
2009/0073563 A1*  3/2009 Betzig ................ G02B 21/0056
                                                        359/578
2009/0074284 A1*  3/2009 Zeineh ................. G02B 21/367
                                                        250/201.3
2016/0305883 A1* 10/2016 Betzig .................... G02B 21/16

* cited by examiner

MULTI-FOCAL LIGHT-SHEET STRUCTURED ILLUMINATION FLUORESCENCE MICROSCOPY SYSTEM

This application is a continuation of U.S. patent application Ser. No. 16/024,807, filed Jun. 30, 2018, which claims benefit of and priority to U.S. Provisional Application No. 62/527,232, filed Jun. 30, 2017, and is entitled to those filing dates for priority. The complete specification, drawings, appendices, and disclosure of U.S. Provisional Application No. 62/527,232 and U.S. patent application Ser. No. 16/024,807 are incorporated herein in their entireties by specific reference for all purposes.

This invention was made with the support of the United States government under NSF Contract No. 1353904. The Government has certain rights in this invention.

FIELD OF INVENTION

This invention relates to an illumination module and related methods for multi-focal light-sheet structured illumination fluorescence microscopy for integration in a commercial fluorescent microscope.

BACKGROUND OF THE INVENTION

Several areas of biological and biomedical research critically depend on three-dimensional (3D) imaging for accurate analysis of subcellular structures within thick cellular samples. Three dimensional imaging with enhanced spatial and temporal resolution is an essential tool for in vivo and in vitro studies of sub-cellular dynamics.

Unfortunately, conventional imaging systems cannot capture the 3D structure of a specimen from one single 2D image. In order to retrieve its structure, a 3D image may be composed computationally by recording a stack of 2D images of different transverse sections within the sample. Such a technique is employed in wide-field microscopy (WFM), wherein images are obtained by scanning the sample volume axially. However, this mechanical movement presents important issues such as a slow acquisition speed, which makes the detection of highly-dynamic biological processes impossible and introduces distortions during the acquisition process. A technique called multi-focal plane microscopy (MMU) provides a simple solution to avoid mechanical scanning by imaging different sections of the specimen using several sensors. However, the imaging capability of MMU is limited by diffraction in the same way as in WFM.

Additional limitations that prevent high quality 3D images of specimens when using WFM or MMU include: (1) limited spatial resolution imposed by diffraction, which is mainly determined by the numerical aperture (NA) of the objective lens used; and (2) inability to obtain high-resolution optically-sectioned images which means that the final three-dimensional image is missing information present in the underlying sample.

Thus, there is a specific need for high accuracy approaches to live-cell microscopy that are not constrained by the thickness of the sample and do not require long data-acquisition times. As discussed in more detail below, different imaging techniques have been proposed and commercialized to overcome these drawbacks during the last decades. However, the shortcomings of conventional microscopy have yet to be addressed in a single technique.

Light-sheet fluorescence microscopy (LSFM) is an alternate technique that combines optical sectioning with multiple-view imaging to observe tissues and living organisms. However, the resolution is, again, limited by diffraction. In LSFM, the sample is illuminated from the side in the focal plane of the detection objective. The illumination and the detection paths are distinct and perpendicular to each other, requiring that the sample be placed at the intersection of the illumination and the detection axes. The light-sheet excites the sample within a thin volume around the focal plane and the emitted fluorescence is collected perpendicularly with a standard objective lens. The main limitation of this technique is that since two objective lenses are required, high-numerical aperture (NA) objectives cannot be used and, as a result, the resolution of the LSFM system is usually low. To overcome this issue, LSFM systems may be combined with two-photon excitation and super-resolution techniques. Moreover, in some LSFM systems, the sample has been illuminated using two light-sheets to provide multi-focal LSFM. However, such a combination introduces additional expense and complexity.

Two widely-used microscopic techniques, confocal scanning microscopy (CSM) and structured illumination microscopy (SIM) can surpass the resolution limit associated with other techniques. CSM is based on point-wise 3D scanning of a specimen using a small pinhole to reject the unwanted out-of-focus light, and SIM is based on the modification of the illumination system of a conventional WFM so that the specimen is illuminated by a structured excitation pattern. The use of a structured illumination (SI) pattern enables the recovery of high-frequency information, which is filtered out by the frequency response of the WFM imaging system, and the reconstruction of high-resolution 3D images can be achieved via computational methods.

Different optical schemes have been proposed to create the needed SI pattern. One configuration is based on the incoherent imaging of a periodic one-dimensional (1D) grid in the object space. Although this method has been commercially implemented, this system is not suitable for increasing the transverse resolution because the contrast of the structured pattern is reduced significantly at high spatial frequencies by the optical transfer function (OTF) of the incoherent illumination system. Another solution creates the structured pattern using the interference of two plane waves, which are produced by the coherent illumination of a 1D grating. This approach allows for doubling of the resolution limit of WFM but cannot produce simultaneously super-resolved images with optical-sectioning capability.

Super-resolved optical-sectioned images have been achieved by producing a 3D SI pattern, which modulates excitation light in both the lateral and axial direction. This structured pattern was obtained by the coherent interference of three plane waves proceeding from a special 1D diffraction grating. However, these illumination systems use coherent illumination that results in coherent noise in the recorded images. Furthermore, these systems also fail to provide the ability to change the frequency of the fringe illuminating pattern because the pattern depends on the grating.

A spatial light modulator (SLM) or other electro-optical device can be used to create rapid frequency-tunable structured fringes in a controlled and accurate mode. However, these technologies present their own drawbacks, including, but not limited to, the following: (1) they are expensive (due to the cost of the SLM or other type of electro-optical device); (2) the generated structured patterns usually are distorted due to the oblique illumination because mode of them operate in reflection mode; (3) there are problems displaying high spatial-frequencies structured patterns due to their finite pixel size and crosstalk effects; and (4) experimental implementation of the SLM illumination system is extremely complex.

Alternatively, a Fresnel biprism illuminated by a set of incoherently-illuminated silts may be used to generate a suitable SI pattern. Using this system, lateral modulation of light depends the distance between the biprism and the source plane, while axial modulation of light can be governed by the number of slits and the separation between them. Although this system provides a tunable structured pattern that can modulate light laterally and axially and lacks coherence noise, use of the Fresnel biprism constrains the available field of view and results in sub-optimal contrast.

Accordingly, what is needed is a system and approach that addresses the above deficiencies in the prior art.

SUMMARY OF INVENTION

In various exemplary embodiments, the present invention comprises a multi-focal light-sheet structured illumination module that can be implemented in any commercial fluorescence microscope. The present invention provides simultaneous capture of 2D images from multiple planes within a 3D volume, which are resolved laterally and axially to provide improved resolution along the three dimensions (x,y,z). The illumination method of this invention employs a Wollaston prism, thereby allowing several axially-localized high-contrast structured illuminations patterns.

In several embodiments, the illumination system provides light-sheet structured patterns onto the sample space of tunable spatial period in order to obtain high resolution images of fluorescent specimens under research. These light-sheet structured patterns are generated by illuminating the Wollaston prism through the emerging spherical wavefront from a set of equidistant and parallel incoherently-illuminated slits. The slits can be illuminated by a spatially-incoherent light. The light source employed may comprise a quasi-monochromatic light emitting diode (LED) or a laser, wherein the spatial coherence of the light emission is broken using, for example, a rotating diffuser. Alternatively, the light source may be a white lamp with a narrow bandwidth filter. Additional light sources may be appropriate for use with the present illumination system in various embodiments.

DETAILED DESCRIPTION OF EXEMPLARY EMBODIMENTS

In various exemplary embodiments, the present system comprises a multi-focal light-sheet structured illumination module that can be implemented in any commercial fluorescence microscope. The present invention provides simultaneous capture of 2D images from multiple planes within a 3D volume, which are resolved laterally and axially to provide improved resolution along the three dimensions (x,y,z). The illumination method of this invention employs a Wollaston prism, thereby allowing several axially-localized high-contrast structured illuminations patterns.

Figure 1A:
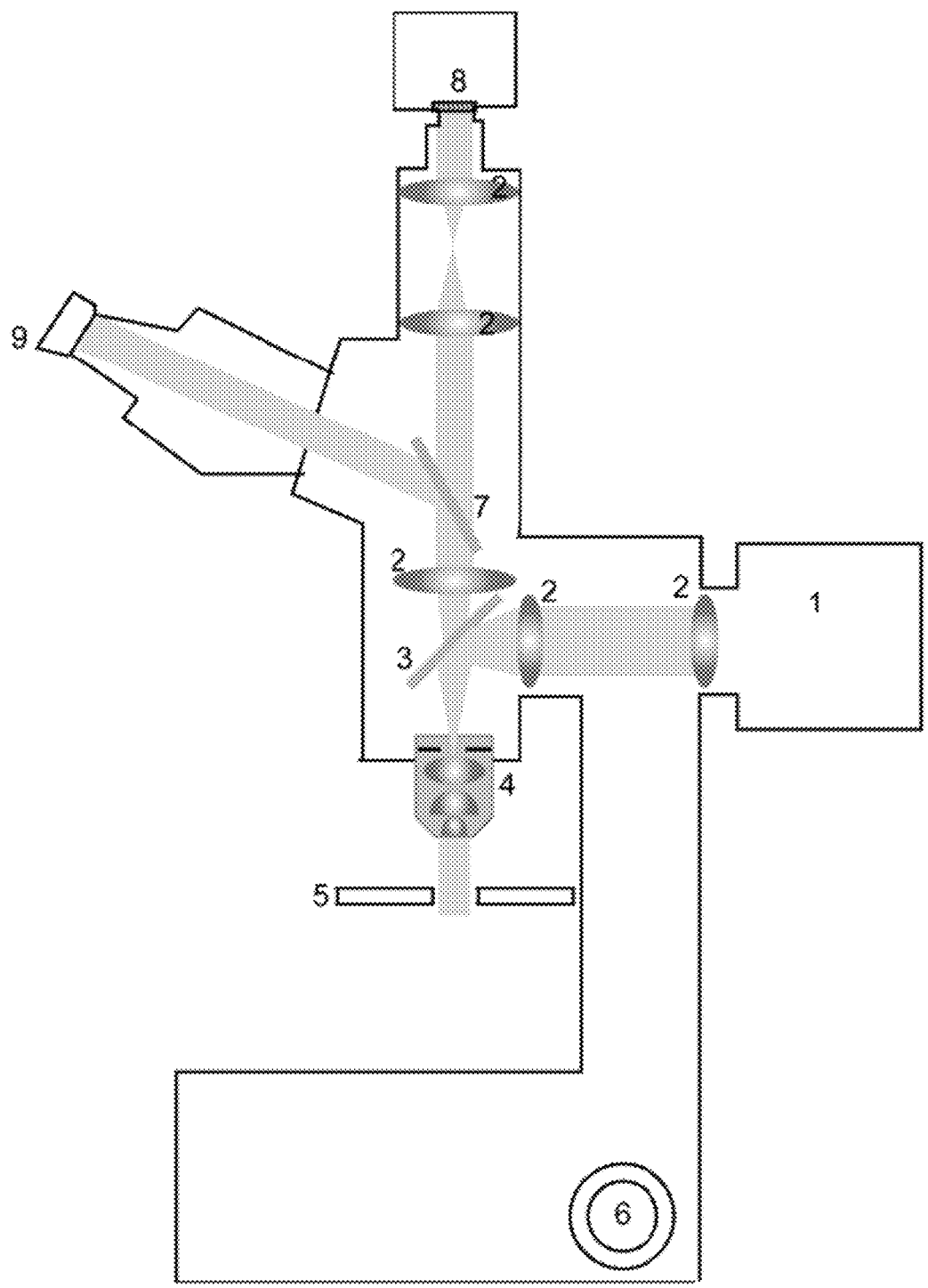
FIG. 1A shows a view of the optical configuration of a conventional fluorescence microscope implemented in an upright scheme.
Figure 1B:
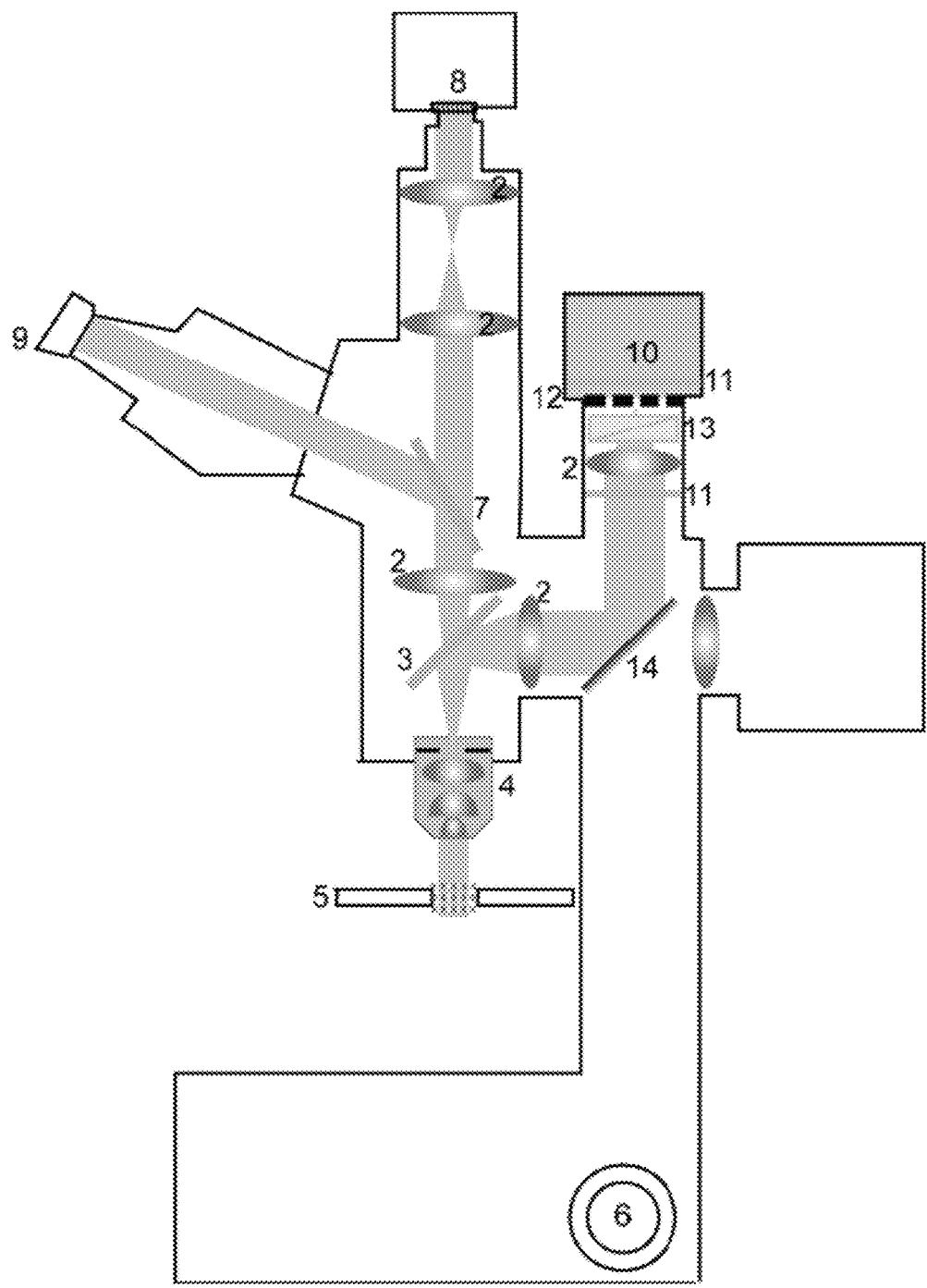
FIG. 1B shows a view of the optical configuration of a multi-focal light sheet structured illumination microscope implemented in an upright scheme in accordance with an embodiment of the present invention.
Figure 2A:
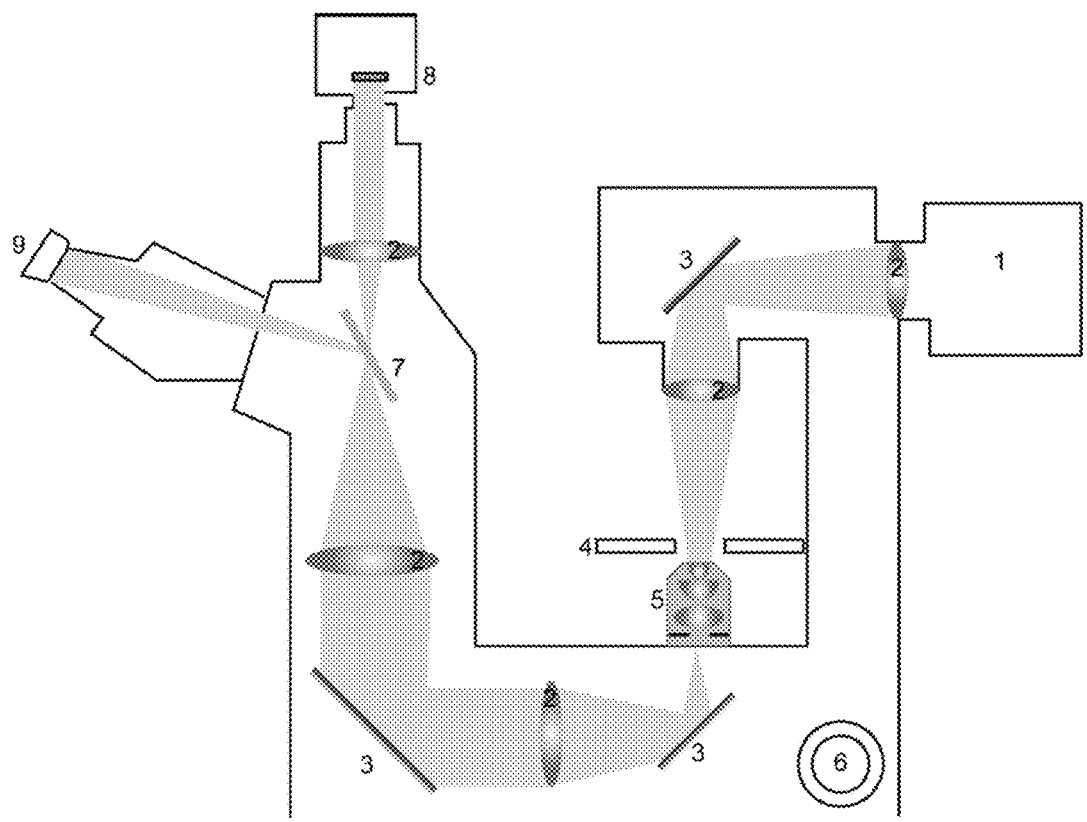
FIG. 2A shows a view of the optical configuration of a conventional fluorescence microscope implemented in an inverted scheme.
Figure 2B:
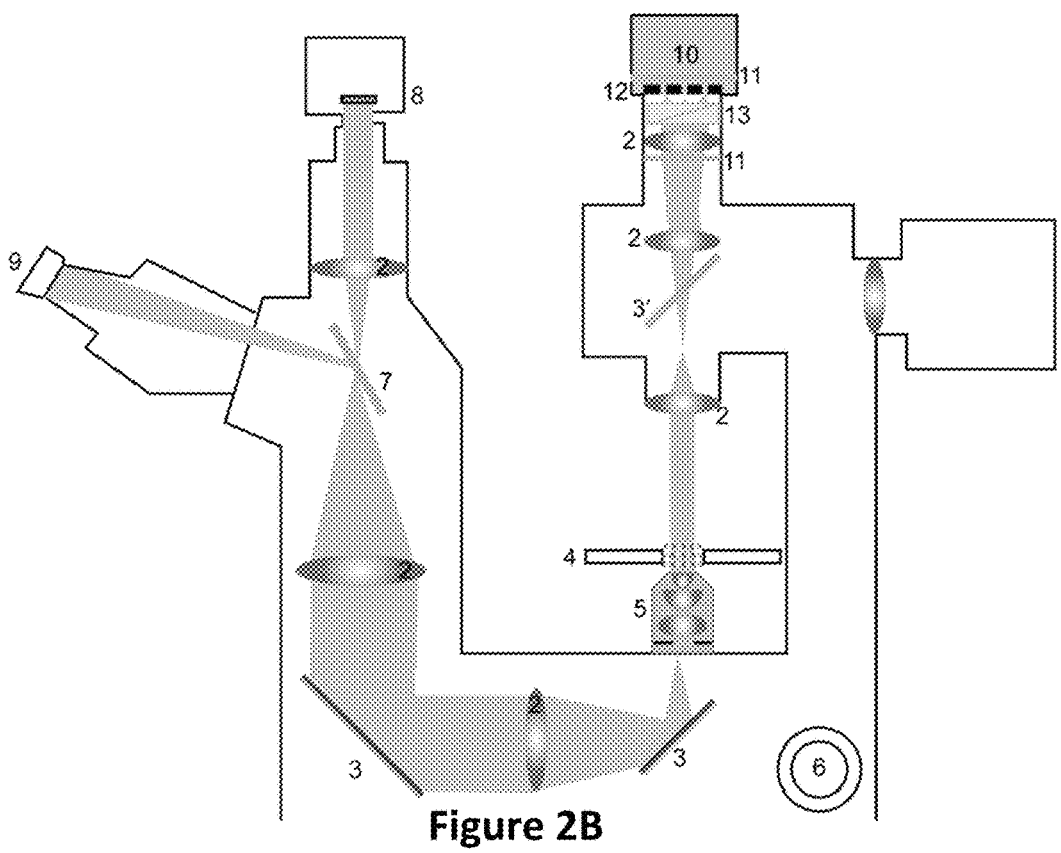
FIG. 2B shows a view of the optical configuration of a multi-focal light sheet structured illumination microscope implemented in an inverted scheme in accordance with an embodiment of the present invention.

FIGS. 1A and 2A show conventional fluorescence microscopes that are not equipped with the illumination system presently disclosed. FIGS. 1B and 2B show a schematic view of a multi-focal light-sheet structured illumination system in accordance with an embodiment of the present invention. As shown in FIGS. 1B and 2B, the conventional microscopes of FIGS. 1A and 2B can be readily adapted to include the illumination system in accordance with embodiments of the present invention.

In the upright configuration of FIG. 1B, incoherent light from an incoherent light source 10 is passed through a first polarizer 11a and a plurality of equidistant slits 12 that are parallel to one another (which may be in the form of a binary mask). Subsequently, the light is split by a Wollaston prism 13. The Wollaston prism 13 may be comprised of two birefringent wedges that are joined together along their respective hypotenuses. In general, a Wollaston prism comprises two orthogonal prisms jointed together along their base to form two right triangle prisms with perpendicular optical axes, so that outgoing light beams diverge with the angle of divergence determined by the prisms' wedge angle and the wavelength of the light. Upon exiting the Wollaston prism 13, the light beam is divided into two spherical waves with orthogonal polarization for each of the plurality of the slits 12. The light is sequentially transmitted through a first converging lens 2f, a quarter-wave plate (214) 14, and a second polarizer 11b. The second polarizer 11b, may be configured to rotate about an axis. In this way, rotation of the second linear polarizer 11b permits a controlled shifting of a structured pattern.

The light beam next is reflected via a folded mirror 7b and transmitted through a second converging lens 2b to be reflected downward via a dichroic mirror 3 and deflected off of a sample being held in a sample holder 5. The light beam can be focused on the sample by manipulation of a focusing screw 6 to move the sample holder relative to objective lens 2. The fluorescent light emitted by the sample is collected by an objective lens 4 and up through the dichroic mirror 3. A third converging lens 2c transmits the light through the eyepiece 9 imaging path or through the sensor 8 imaging path using a second folded mirror 7a. If the light is not reflected by the folded mirror 7a, then it is transmitted through a fourth converging lens 2d and fifth converging lens 2e, and, ultimately, the image is projected onto a sensor 8 for collection of the image data.

In the inverted configuration of FIG. 2B, light from an incoherent light source 10 is passed through a first polarizer 11a and a plurality of equidistant slits 12 that are parallel to one another (which, as noted above, may be in the form of a binary mask). Subsequently, the light is split by a Wollaston prism (as described above) 13. The light is sequentially transmitted through a first converging lens 2f, a quarter-wave plate (214) 14, and a second polarizer 11b. The second polarizer 11b may be configured to rotate about an axis. In this way, rotation of the second linear polarizer 11b permits a controlled shifting of a structured pattern.

The light beam passes sequentially through a second converging lens 2g, a first dichroic mirror 3a, and a third converging lens 2b, which directs light to the sample holder 4 with a sample being held therein. The light can be focused on the sample by manipulation of a focusing screw 6. The fluorescent light emitted by the sample is collected by an objective lens 5, reflected by two mirrors 7a, 7b, and transmitted through two converging lenses 2c, 2d. A folded mirror 3b projects the image through an eyepiece 9 or the sensor 8. Before forming the image on the sensor for collection of the image data, the light passes through a sixth converging lens 2e.

As seen by comparing FIG. 1A with FIG. 1B, or FIG. 2A with FIG. 2B, the above-described systems replace the simple light source 1 and converging lens 2a used in the prior art.

It should be noted that the arrangement and number of lenses 2, and mirrors 3, 7 may be flexible, and that the arrangements shown in FIGS. 1B and 2B represent exemplary embodiments. Alternate arrangements that do not affect the optical resolution of the images obtained are envisioned.

For a non-limiting example, the Wollaston prism can be replaced by any polarization-sensitive beam splitter. In another alternative, the binary mask could be generated using a programmable electro-optical device (e.g., a SLM), thereby providing control of a variable separation between the slits and the number of slits required.

As shown, the illumination system provides light-sheet structured patterns onto the sample space 4 of tunable spatial period in order to obtain high resolution images of fluorescent specimens under research. These light-sheet structured patterns are generated by illuminating the Wollaston prism 13 through the emerging wavefront from a set of equidistant and parallel slits 12. The slits 12 can be illuminated by a spatially-incoherent light 10. The light source 10 employed may comprise a quasi-monochromatic light emitting diode (LED) or a laser, wherein the spatial coherence of the light emission is broken using, for example, a rotating diffuser. Alternatively, the light source 10 may be a white-light lamp with a narrow bandwidth filter. As obvious to one of skill in the art, additional light sources may be appropriate for use with the present illumination system in various embodiments.

The presently disclosed illumination system provides the incoherent superposition of N high-contrast sinusoidal patterns. Each of these N structured patterns are axially-extended and there is a lateral displacement among them which produces axially-localized structured fringes. Because of this lateral displacement, the visibility of the structured pattern changes periodically, defined by the following Equation 1:

$$V(z, N) = \frac{\sin\left(\pi N \frac{(u_e - u_o)\eta}{f} x_0 \frac{z}{f}\right)}{N \sin\left(\pi \frac{(u_e - u_o)\eta}{f} x_0 \frac{z}{f}\right)},$$

where $u_e = -u_O = \alpha_W(n_e - n_O)/\lambda$ and $\alpha W$ are the apex angles of the birefringent wedges; ne and nO are an extraordinary and an ordinary refractive index of the Wollaston material, respectively; $\eta$ is an axial separation between the slits and the Wollaston prism; f is the focal length of the converging lens inserted after the Wollaston prism; and z is an axial distance between the lens and the observation plane.

To provide a period-tunable structured illumination system, the incoherently-illuminated slits 12 are set at the front focal plane of a converging lens 2f, whose focal length is f, and the Wollaston prism 13 is inserted between them. In this orientation, axial displacement (i.e, orthogonal relative to the illuminating light beam) of the Wollaston prism 13, ($\eta$), produces a continuous variation of the spatial-period in the structured pattern, p, given by the following Equation 2:

$$p = \frac{f}{(u_e - u_o)\eta}.$$

with terms as defined above.

As previously mentioned, the structured pattern created by the Wollaston prism 13 after the converging lens is imaged onto the sample plane by means of an afocal telecentric imaging system (comprising 2b and 4 of FIG. 1B, and 2g and 2b of FIG. 2B). Inside the 3D volume of the specimen one can find different axial planes with high-contrast structured fringes. Thus, multi-focal light-sheet structured pattern of period-tunability can be obtained on the sample volume. While the lateral period of the fringes can be tuned by axially displacing the Wollaston prism 13, see Eq. 2, the axial positions ($z_{max}$) and the separation of the different structured planes is mainly determined by the separation between the slits 12 ($x_0$) and totally independent of the number of slits, as seen in the following Equation 3:

$$z_{max} = (2m + 1)\frac{f^2}{(u_e - u_o)\eta x_0},$$

where m is a positive integer. From this equation, one can derive that the axial separation between two planes of maximum visibility is determined by the following Equation 4:

$$T = \frac{f^2}{(u_e - u_o)\eta x_0}.$$

In this illumination system, the higher the number of slits 12, the narrower the axial confinement of the fringes, meaning that the axial confinement ($\Delta z$) of these patterns is inversely proportional to the number of incoherently-illuminated slits 12 (N). The axial extension of the planes with maximal contrast is defined by the following Equation 5:

$$\Delta z = \frac{f^2}{N(u_e - u_o)\eta x_0}$$
$$= T/N.$$

The illumination system may generate a light-sheet structured pattern in a sample plane of axial extension defined by the following Equation 6:

$$\Delta z' = M_{ill}^2 \Delta z$$

$$= M_{ill}^2 \frac{f^2}{N(u_e - u_o)\eta x_0},$$

and a lateral period defined by the following Equation 7:

$$p' = M_{ill} p$$

$$= M_{ill} \frac{f}{(u_e - u_o)\eta},$$

where $M_{ill}$ is the lateral magnification between an illumination plane and the sample plane.

As shown in FIGS. 1B and 2B, the illumination system disclosed herein is uniquely designed to be implemented in any commercial microscope as an external illumination module. The illumination system can be fitted to commercial microscopes in a transmission or a reflection configuration and in upright and inverted schemes. Since the disclosed multi-focal light-sheet SIM system requires minimal implementation, the illumination system maintains the advantages of any commercial microscope in terms of robustness, stability, and user-friendly operation while simultaneously offering the additional advantages disclosed herein.

Advantages of the multi-focal light sheet structured-illumination system include, but are not limited to, the following: (1) generation of high-contrast structured fringes with tunable spatial-frequency; (2) phase-shifting of the recorded structured images by rotating a polarizer when the light used to illuminate the Wollaston prism is circularly-polarized; (3) every 90-degree rotation of the analyzer providing a phase-shifting of 7E radians in the fringes, independent of the lateral modulation frequency of the structured pattern, and thus calibration is not needed; (4) creation of multi-focal light-sheet structured fringes inside the volume of the specimen which permits recording of the 3D structure of the sample without any movement of the sample, itself; (5) no coherence noise to distort the recorded images; (6) discrimination of different features of biological samples based on their response to a specific direction of light polarization because the Wollaston prism is a polarization-sensitive device; (7) accomplishing optical-sectioning capability comparable to that of LSFM without requiring two objectives lenses and overcoming the resolution limit; and (8) overcoming the resolution limit by recording three phase-shifted raw images instead of nine needed by other SIM systems (this reduction in data-acquisition is an advantage for live-cell imaging, which requires fast imaging and at lower light exposures).

Figure 3:
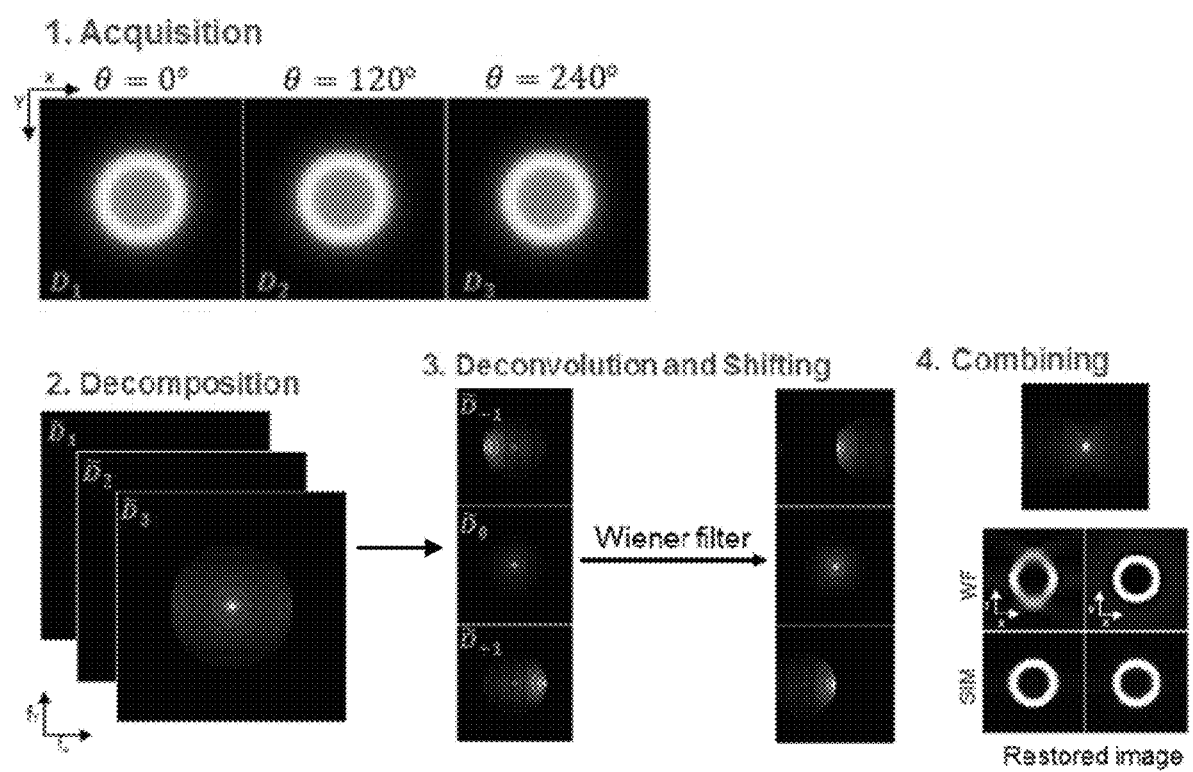
FIG. 3 shows a schematic description of the steps required to retrieve restored super-resolved (SIM) images from the recorded structured-illumination microscopy images through the acquisition of 3 images with different phases.

The images recorded by the camera should be computationally processed in order to obtain super-resolved images with optical-sectioning capability. FIG. 3 shows the acquisition and processing steps of this technique. This process can be divided in four main steps, and with the proper code, the restored images can be obtained almost in real-time. The first step is the acquisition phase. In the acquisition phase, 3D forward images ($D_1$, $D_2$, $D_3$) are captured with three different phases ($\phi_1$, $\phi_2$, $\phi_3$) by axially scanning the specimen's volume, with 3D irradiance distribution given by O(r). At each field of view, three images are acquired that correspond to three different phases of the structured pattern along the direction of the fringes. In the second step, the images are decomposed according to the following formulas, which includes computation of the fast 3D Fourier transform of the 3D images:

$$\begin{pmatrix} \tilde{D}_{-1}(f) \\ \tilde{D}_0(f) \\ \tilde{D}_{+1}(f) \end{pmatrix} =$$

$$\begin{pmatrix} \tilde{O}(f_{xy} + f_{p;x}, f_z)FT\{H(r) \times V(z)\} \\ \tilde{O}(f)\tilde{H}(f) \\ \tilde{O}(f_{xy} - f_{p;x}, f_z)FT\{H(r) \times V(z)\} \end{pmatrix} = \begin{pmatrix} e^{+i\phi_1} & 1 & e^{-i\phi_1} \\ e^{+i\phi_2} & 1 & e^{-i\phi_2} \\ e^{+i\phi_3} & 1 & e^{-i\phi_3} \end{pmatrix}^{-1} \begin{pmatrix} \tilde{D}_1(f) \\ \tilde{D}_2(f) \\ \tilde{D}_3(f) \end{pmatrix},$$

where H(r) stands for the impulse response of the imaging system, V(z) is the axial modulation of the visibility of the illumination pattern, and $f_{p;x}$ is the lateral spatial frequency of this pattern in the sample's volume. In this equation, $\tilde{X} = FT\{X\}$ represents the 3D Fourier transform of the function X.

After decomposition, the deconvolution and shifting set occurs, wherein three new 3D components are calculated by demodulating each SIM image using a Wiener filter. During shifting, the positions of the new components are centered in the Fourier domain. Finally, in the fourth step, the centered, deconvoluted, 3D images are combined to form the restored images. This step is accomplished by way of a linear sum, calculating the inverse fast 3D Fourier transform of the combination. Alternatively, different processing methods applicable to any SIM approach can be used to process the data acquired from this multi-focal light sheet structured-illumination system Note that isotropic improvement in 3D resolution is achieved by rotating the structured pattern and acquiring data in 3 different orientation angles. This fringes' rotation can be produced by rotating jointly the first polarizer, the binary mask, the Wollaston prism and the quarter-wave plate. Commonly, one should acquire 3 phase-shifted SIM images per orientation (a total number of 9 images per transverse section) and apply the reconstruction method described above to achieve the final 3D super-resolution image. However, taking advantage of information redundancy, the total number of recorded images can be reduced to four images (two taken in the first orientation and one for each of the remaining two orientations).

In some embodiments, the system further comprises a polarization rotator (which may be mechanically, electrically, or optically driven) disposed between the quarter-wave plate and the second linear polarizer. In additional embodiments, alternation of the orientation of the plurality of light-sheet structured patterns is achieved by a tunable image rotator after the Wollaston prism, as (but not limited to) a mirror combination or a Dove prism.

Embodiments of the illumination system disclosed herein provide a number of novel aspects that are not currently available in the prior art. The novel aspects include, but are not limited to: (1) continuous variation of the spatial-period of the structured pattern fringes; (2) axial localization of the structured fringes (light-sheet structured patterns); (3) simultaneous illumination of multiple axial plane within the specimen; (4) polarization-sensitive illumination system; and (5) an external illumination module adaptable to any commercial fluorescent microscope.

The illumination system disclosed herein also offers numerous distinct advantages over current technology. Importantly, the embodiments of the present invention permit tunability of the structured fringes with the axial displacement of the Wollaston prism 13. This advantage circumvents the use of a spatial light modulator (SLM), which is currently used by many researchers and manufacturers.

Unlike the presently disclosed illumination system, SLMs are extremely expensive and are not designed to be easily implemented in a commercial microscope. In addition, embodiments of the present invention use incoherent light, which is a significant advantage because the coherent light used in commercially available microscopes produces coherent noise that interferes with and distorts the ultimately recorded images. Further, in the present invention, there is no reduction of the contrast of the structured fringes for high spatial-frequency as in commercially-available modules.

Aspects of the presently disclosed invention provide high optical-sectioning capability while simultaneously overcoming the resolution limit. The high optical-sectioning is somewhat comparable to conventional light-sheet microscopy; however, unlike light-sheet microscopy, the present invention accomplishes such high-optical sectioning through the use of only a single objective lens. The present illumination is also capable of simultaneous illumination of different transverse sections of a specimen. In this way, multiple focal planes can be detected through the use of multiple cameras.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A structured illumination system for a fluorescence microscope, comprising:
   a first linear polarizer configured to receive a light beam;
   a plurality of equidistant parallel slits configured to be illuminated by the light beam after passing through the first polarizer;
   a Wollaston prism comprising two birefringent wedges, each birefringent wedge with an optical axis, configured to divide the light beam into two spherical waves to generate a plurality of light-sheet structured patterns;
   a first converging lens with a front focal plane, configured to receive the divided light beam after passing through the Wollaston prism, wherein the front focal plane is collinear with the plurality of equidistant parallel slits; and
   a second linear polarizer configured to receive the light beam after passing through the first converging lens but prior to illuminating a sample.

2. The system of claim 1, wherein said plurality of equidistant parallel slits are disposed in a binary mask with a vertical axis.

3. The system of claim 2, wherein the optical axes of the birefringent wedges are orthogonal to each other, and both optical axes are oriented at an angle of about 45 degrees with respect to the vertical axis of the binary mask.

4. The system of claim 3, wherein the first linear polarizer is oriented at an angle of about 45 degrees with respect to both optical axes.

5. The system of claim 2, the binary mask further comprising a horizontal axis, wherein displacement of the Wollaston prism orthogonal to the vertical axis of the binary mask and parallel to the horizontal axis of the binary mask produces a controlled shifting of the plurality of light-sheet structured patterns.

6. The system of claim 2, further wherein alteration of the orientation of the plurality of light-sheet structured patterns is achieved by joint rotation of the binary mask, the first linear polarizer, a quarter-wave plate, and the Wollaston prism.

7. The system of claim 1, wherein the incoherent light source comprises a quasi-monochromatic light-emitting diode, a white lamp with a narrow bandwidth filter, or a coherent light source with a rotating diffuser, wherein the rotating diffuser is configured to destroy a spatial coherence of the coherent light source.

8. The system of claim 1, further comprising a quarter-wave plate disposed between the Wollaston prism and the second linear polarizer.

9. The system of claim 8, further comprising a polarization rotator disposed between the quarter-wave plate and the second linear polarizer.

10. The system of claim 1, further wherein alteration of the orientation of the plurality of light-sheet structured patterns is achieved by a tunable image rotator positioned after the Wollaston prism.

11. The system of claim 1, wherein the plurality of light-sheet structured patterns further comprise a tunable spatial-period tuned by adjusting the axial separation between the plurality of equidistant parallel slits and the Wollaston prism.

12. The system of claim 1, wherein the plurality of light-sheet structured patterns comprises an axial confinement that is inversely proportional to the number of equidistant parallel slits.

13. The system of claim 1, further comprising
   a single objective lens; and
   a recording system, wherein the recording system comprises a plurality of cameras for the simultaneous detection of multiple focal planes.

14. The system of claim 1, wherein the illumination system is configured to retro-fit a plurality of fluorescent microscopes.

15. A method for obtaining super-resolved images with high optical-sectioning capability, comprising the steps of:
   producing a light beam from an incoherent light source;
   passing the light beam through a first linear polarizer and a plurality of equidistant parallel slits;
   subsequently splitting the light beam by a Wollaston prism into two spherical waves with orthogonal polarization for each of the equidistant slits to generate a light-sheet structured pattern; and
   prior to illuminating a sample, subsequently passing the beam through a converging lens and a second polarizer.

16. The method of claim 15, further comprising the steps of:
   illuminating a sample with the beam;
   capturing images from the sample through a recording system; and
   processing the captured images;
   wherein the recording system comprises a plurality of cameras.

17. The method of claim 16, further comprising the steps of:
   simultaneously illuminating a plurality of transverse sections of the sample;
   simultaneously capturing a plurality of focal planes of the sample by the plurality of cameras.

18. The method of claim 17, further comprising the steps of:
  axially scanning the volume of the sample;
  capturing a plurality of two-dimensional images from the plurality of focal planes within the three-dimensional volume of the sample; and
  resolving the captured two dimensional images laterally and axially to create super resolved images along three dimensions.

19. The method of claim 18, further comprising the steps of:
  capturing three separate two-dimensional images from each of the plurality of focal planes.

20. The method of claim 15, further comprising the steps of:
  capturing a plurality of three-dimensional forward images;
  decomposing the plurality of three-dimensional forward images;
  applying a Wiener filter to the decomposed images for deconvolution and shifting; and
  combining the filtered images to form restored super-resolved images.

* * * * *